Patented Oct. 4, 1949

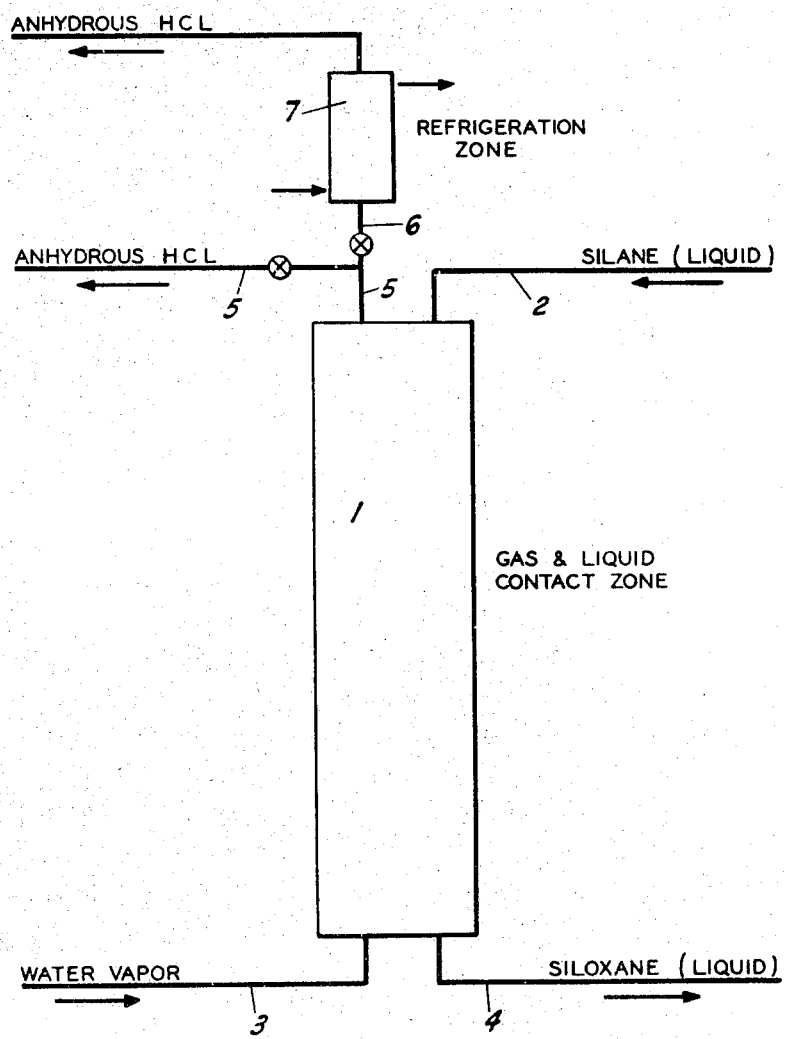

2,483,963

UNITED STATES PATENT OFFICE 2,483,963

PRODUCTION OF ORGANOSILOXANES

Arthur J. Barry and Elwyn E. Merrill, Midland, Mich., assignors to Dow Corning Corporation, Midland, Mich., a corporation of Michigan Application November 24, 1948, Serial No. 61,788

6 Claims. (Cl. 260—448.2)

The present invention relates to the production of organosiloxanes, and in particular, involves the hydrolysis of hydrolyzable organochlorosilanes to produce the organosiloxanes.

Heretofore, the usual method of hydrolyzing organosilanes with water has been by batch processing in liquid phase. The resulting water-insoluble organosiloxane is then separated from aqueous hydrochloric acid. The use of various type of solvents in the hydrolysis of organochlorosilanes has been described in the art. A characteristic feature of these processes is that the hydrochloric acid produced is of only slight value due to being quite dilute. If the proportion of water is reduced to avoid dilution, the percentage of unhydrolyzed chlorine is increased. It might be possible to adapt this batch method of hydrolysis to continuous production of organosiloxanes, but even if this were done, hydrolysis of the organochlorosilane would still be incomplete and the hydrochloric acid dilute.

An object of this invention is to provide a continuous process for hydrolyzing organochlorosilanes which yields an improved siloxane product, and to provide such a process which yields anhydrous hydrogen chloride. Other objects and advantages of the present invention will be apparent from the following description and the subjoined claims.

In accordance with the present invention the hydrolysis of organochlorosilanes is effected by introducing the silane in liquid phase at the upper end of a gas and liquid contact zone and introducing water vapor at the lower end of said zone. The silane is introduced in sufficiently large proportion relative to the water vapor that the hydrogen chloride which issues from the upper end of said zone is anhydrous. The water vapor is introduced in sufficiently large proportion relative to the silane to react with and effect hydrolysis of said silane with the condensation of hydrolysis product thereof to siloxane.

The organochlorosilanes which may be hydrolyzed are of the type, $R_nSiCl_{4-n}$, where $n$ has a value of at least 1.7. Thus, the silane hydrolyzed may be either of the type, $R_2SiCl_2$ or $R_3SiCl$ or mixtures thereof. Likewise, the silane may contain $SiCl_4$ or compounds of the type $RSiCl_3$ or both, though the proportion of these highly functional materials should be sufficiently limited that $n$ has the indicated value. In the above type formulae, R represents alkyl or monocyclic aryl hydrocarbon radicals.

The accompanying drawing is a flow sheet which illustrates the process of the present invention.

The liquid organochlorosilane to be hydrolyzed is introduced into the upper end of zone 1 through a line 2. Water vapor is introduced into the lower end of zone 1 through a line 3. The silane and the water vapor interact in the contact zone with the production of liquid organosiloxane which may be withdrawn from the lower end of zone 1 by a line 4, and of anhydrous hydrogen chloride which may be withdrawn by line 5 from the upper end of zone 1.

One of the difficulties encountered in liquid phase hydrolysis of organochlorosilanes is the overheating of the silicon compounds due to the hydrolysis reaction being exothermic. For this reason, it has been a common method in the hydrolyzing of organochlorosilanes to pour the silane or a solution of the silane in an organic solvent onto crushed ice or to employ a large excess of water. Overheating frequently results in the cleavage of organic radicals from the silane. The vaporization of hydrogen chloride from a reaction mixture is substantially endothermic. The endothermic character of this vaporization results in the contact zone 1 functioning at a relatively low temperature without the tendency thereof to overheat as is customary in the hydrolysis of organochlorosilanes in accordance with conventional methods.

In the upper end of the contact zone, the liquid phase is principally unhydrolyzed organochlorosilane. The vapor phase in that portion of the zone will be principally hydrogen chloride. Any water vapor rising in the zone into the upper portion avidly reacts with the chlorosilane and thereby effects a stripping of this water vapor from the vapor phase. In the case of silanes which have relatively high vapor pressures there may be a significant percentage of the silane in the vapor phase which may leave the zone by the line 5. In this instance the anhydrous hydrogen chloride containing organochlorosilane may be passed by line 6 to refrigeration zone 7 in which the vapor is cooled by indirect heat exchange. This will reduce the percentage of organochlorosilane in the vapor. The condensed portion of the organochlorosilane may be returned to the contact zone through the lines 6 and 5 or it may be withdrawn from the refrigeration zone 7 and passed with fresh silane through the line 2 into the contact zone 1.

In the case of silanes which have relatively high boiling points, the temperature of operation of the upper end of the zone may be either below, at or above the temperature employed in the lower portion of the zone. However, high temperatures may be disadvantageous due to resulting in high reaction temperature and due to increasing the carry over of silane with hydrogen chloride.

In the lower portion of the contact zone, the liquid phase consists principally of siloxane, which may contain some hydrolyzable chlorine bonded to some of the silicon atoms of the siloxane. The water vapor in contact with this siloxane effects hydrolysis of residual chlorine present. Inasmuch as the water vapor is supplying heat to the contact zone I, some condensation of the water vapor may occur with the withdrawal of some liquid phase water with the siloxane. Accordingly, it is in some instances desirable to supply the lower portion of the contact zone with heat by indirect heat exchange, whereby to furnish sufficient heat to the zone to prevent the withdrawal of any water in liquid phase with the siloxane.

In a specific embodiment of the present invention the water vapor may be supplied to the contact zone I from a batch still which feeds directly to the contact zone. In this instance, heat may be supplied to the zone through the condensation of water vapor and the condensed water returned to the still, together with the siloxane, where the water is reboiled.

If desired, a mixture of water vapor and hydrogen chloride may be fed to the lower end of the contact zone. In this instance the process hereof operates to effect the drying of the moist hydrogen chloride employed for hydrolysis whereby anhydrous hydrogen chloride is obtained from the moist hydrogen chloride together with process hydrogen chloride from the present method.

The contact zone I may be any conventional equipment for gas and liquid contact such as a bubble-cap column, a packed column, or combinations thereof, it being possible to employ a series of such columns.

In each of the following examples the hydrogen chloride obtained was anhydrous.

EXAMPLES

*Example 1*

A solution of 20 percent HCl was placed in a pot attached to the bottom of a packed fractionating column. The pot was heated until water vapor reached approximately the mid-point of the column. At this time, dimethylsilicon dichloride was introduced into the top of the column, at a flow rate of 161.3 pounds per cubic foot of column per hour and at a temperature of 25° C. Water at 18° C. was used as a coolant in a cooling jacket placed around the top of the column. Hydrogen chloride was formed by hydrolysis and was withdrawn from the top of the column. The hydrogen chloride carried with it 28.36 pounds of dimethylsilicon dichloride per cubic foot of column per hour. Later the cooling water was changed to a refrigerant at 0° C. At this temperature the carry over was reduced to 3.9 percent or 6.29 pounds per cubic foot of column per hour. A 95 percent yield of dimethyl siloxane fluid was obtained which fluid had a viscosity of 250 to 1000 cs. at 25° C. This siloxane was substantially free of chlorine as none was found upon qualitative examination of the siloxane.

*Example 2*

Phenylmethylsilicon dichloride was hydrolyzed as in Example 1 at a flow rate of 2.52 volumes per volume of column per hour, and with a jacket temperature of −15° C. Only 0.59 percent of the phenylmethylsilicon dichloride was carried over with the hydrogen chloride. A phenylmethylsiloxane substantially free of chlorine and with a viscosity of 200–300 cs. was obtained in a yield of 98.5 percent.

*Example 3*

Phenyldimethylsilicon chloride was hydrolyzed as in Example 1 at a flow rate of 2.32 volumes per volume of column per hour and with a jacket temperature of −15° C. Of the raw material, phenyldimethylsilicon dichloride, 5.39 percent was carried over with the hydrogen chloride. The hydrolysis proceeded as in Example 1. An 81.4 percent yield of tetramethyldiphenylsiloxane was obtained. This siloxane, which was found to be substantially free of chlorine, was dried with $CaCl_2$.

*Example 4*

Trimethylsilicon chloride was hydrolyzed as in Example 1 at a flow rate of 2.52 volumes per volume of column per hour and with a jacket temperature of −9° C. Of the trimethylsilicon chloride introduced, 7.34 percent was carried over with the hydrogen chloride. Hexamethyldisiloxane was thereby produced with a yield of 91.6 percent. It was substantially free of chlorine.

*Example 5*

Ethylmethylsilicon dichloride was hydrolyzed as in Example 1 at a flow rate of 2.32 volumes per volume of column per hour and at a jacket temperature of −12° C. Only 2.14 percent of the ethylmethylsilicon dichloride was carried over with the hydrogen chloride. An ethylmethyl siloxane substantially free of chlorine with a viscosity of 200–250 cs. was obtained in a yield of 90 percent.

*Example 6*

A mixture of dimethylsilicon dichloride and trimethylsilicon chloride in the ratio of 5 grams of $Me_2SiCl_2$ per gram of $Me_3SiCl$ was hydrolyzed as in Example 1. The flow rate was 2.52 volumes per volume of column per hour. A jacket temperature of −10° C. was maintained. The carry over was 7.26 percent. A product with a viscosity of 10 cs. was obtained in a yield of 99.2 percent. This fluid was substantially free of chlorine.

*Example 7*

A mixture of diphenylsilicon dichloride and trimethylsilicon chloride in the ratio of 2.34 grams of $Ph_2SiCl_2$ per gram of $Me_3SiCl$ was hydrolyzed as in Example 1. The flow rate was 2.32 volumes per volume of column per hour. A jacket temperature of −8° C. was maintained. The carry over was 4.8 percent. The viscosity of the resulting fluid was 250 cs., which increased after 20–30 days to 1000 cs. This fluid substantially free of chlorine was obtained in a yield of 85.3 percent.

*Example 8*

A 58 percent solution of diphenylsilicon dichloride in benzene was hylrolyzed as in Example 1 at a flow rate of 2.32 volumes per volume of column per hour and at a jacket temperature of −12° C. On this occasion there was no carry over. The hydrolyzate with a viscosity of 10 cs. was very mobile, and after subtracting the weight of the benzene there was a yield of 93.2 percent. This diphenyl siloxane was substantially free of chlorine.

Example 9

A 56 percent solution of dimethylsilicon dichloride in toluene was hydrolyzed as in Example 1. The flow rate was 2.52 volumes per volume of column per hour, and the jacket temperature was —8° C. The carry over of dimethylsilicon dichloride was 3 percent. A dimethylpolysiloxane with a viscosity of 10 cs. was obtained in a yield of 92.4 percent. This product was substantially free of chlorine.

Example 10

A mixture of 15 parts by weight of dimethylsilicon dichloride, one part of trimethylsilicon chloride, one part of methylsilicon trichloride, and one part of silicon tetrachloride was hydrolyzed as in Example 1. The flow rate was 2.32 volumes per volume of column per hour, and the jacket temperature was —12° C. There was a carry over of 7.78 percent of the mixture with the hydrogen chloride. A methyl siloxane with a viscosity of 10 cs. was obtained in a yield of 96 percent. This fluid was substantially free of chlorine.

Example 11

A mixture of 45 mol percent of phenylmethylsilicon dichloride, 45 mol percent of dimethylsilicon dichloride, and 10 mol percent of trimethylsilicon chloride was hydrolyzed as in Example 1. The flow rate of this mixture was 2.32 volumes per volume of column per hour, and the jacket temperature was —12° C. A copolymer fluid substantially free of chlorine was obtained.

That which is claimed is:

1. The process of preparing organosiloxanes from organochlorosilanes of the type $R_nSiCl_{4-n}$ where R is an alkyl or a monocyclic aryl radical and $n$ has a value of at least 1.7, which comprises introducing said silane in liquid phase at the upper end of a gas and liquid contact zone, and introducing water vapor at the lower end of said zone, introducing the silane in sufficiently large proportion relative to the water vapor that the hydrogen chloride which issues from the upper end of said zone is anhydrous, and introducing the water vapor in sufficiently large proportion relative to the silane to react with and effect hydrolysis of said silane with condensation of hydrolysis product thereof to siloxane.

2. The process in accordance with claim 1 in which the hydrogen chloride from the upper end of said zone is refrigerated to effect a condensation of silane vapor contained therein and the condensed silane is returned to said contact zone.

3. The process in accordance with claim 1 in which the lower portion of said contact zone is heated by indirect heat exchange whereby to prevent the withdrawal of water in liquid phase with the siloxane produced.

4. The process in accordance with claim 1 in which $n$ has a value from 2 to 3 inclusive.

5. The process in accordance with claim 1 in which the silane contains dimethyldichlorosilane.

6. The process in accordance with claim 1 in which the silane contains phenylmethyldichlorosilane.

ARTHUR J. BARRY.
ELWYN E. MERRILL.

No references cited.